US010989110B2

(12) United States Patent
Maynard

(10) Patent No.: US 10,989,110 B2
(45) Date of Patent: Apr. 27, 2021

(54) GASEOUS FLUID COMPRESSION WITH ALTERNATING REFRIGERATION AND MECHANICAL COMPRESSION USING A FIRST AND SECOND BANK OF COMPRESSION COUPLED WITH FIRST AND SECOND CASCADING HEAT PUMP INTERCOOLERS HAVING A HIGHER AND A LOWER TEMPERATURE SECTION

(71) Applicant: Mark J. Maynard, Easthampton, MA (US)

(72) Inventor: Mark J. Maynard, Easthampton, MA (US)

(*) Notice: Subject to any disclaimer, the term of this patent is extended or adjusted under 35 U.S.C. 154(b) by 156 days.

(21) Appl. No.: 16/250,736

(22) Filed: Jan. 17, 2019

(65) Prior Publication Data

US 2019/0218968 A1    Jul. 18, 2019

Related U.S. Application Data

(60) Provisional application No. 62/618,720, filed on Jan. 18, 2018.

(51) Int. Cl.
*F02C 1/00*        (2006.01)
*F25B 30/06*      (2006.01)
(Continued)

(52) U.S. Cl.
CPC ............... *F02C 1/00* (2013.01); *F04B 25/00* (2013.01); *F04B 39/16* (2013.01); *F04B 41/06* (2013.01);
(Continued)

(58) Field of Classification Search
CPC ...... F04D 13/12; F04D 17/12; F04D 29/5866; F25B 1/10; F25B 2309/061;
(Continued)

(56) References Cited

U.S. PATENT DOCUMENTS 261,605 A * 7/1882 Hill ........................... F04B 3/00
                                                      417/248
688,520 A * 12/1901 Hill ......................... F04B 49/24
                                                      417/251
(Continued)

FOREIGN PATENT DOCUMENTS

CN           1277928 A      12/2000
CN          20362155 U      6/2014
(Continued)

OTHER PUBLICATIONS

United States Patent & Trademark Office, International Search Report and Written Opinion,PCT/ISA/220, Application No. PCT/US2019/014039, dated Apr. 29, 2019, U.S. Patent & Trademark Office, Alexandria, VA.

*Primary Examiner* — Patrick Hamo
*Assistant Examiner* — Benjamin Doyle
(74) *Attorney, Agent, or Firm* — Nutter McClennen & Fish LLP

(57) ABSTRACT

A gaseous compression system for compressing a gas from an initial pressure to an exit pressure with a first, blower compression bank and a second, mechanical compression bank. Each compression bank has plural stages of gaseous compression with a gaseous fluid compressor and a heat pump intercooler. The heat pump intercooler comprises a cascading heat pump intercooler with a high temperature section, a medium temperature section, and a low temperature section, each temperature section with an intercooler core. Each stage of the blower compression bank has a high-pressure blower, and each stage of the mechanical compressor bank has a mechanical compressor. A final stage of gaseous compression is without a heat pump intercooler. Gas compressed by the gaseous fluid compression system can be injected into a gas-driven generator to generate
(Continued)

electric power from movement of a working fluid induced by injection of the compressed gas.

22 Claims, 8 Drawing Sheets

(51) Int. Cl.
| | |
|---|---|
| *F04D 29/58* | (2006.01) |
| *F04D 29/00* | (2006.01) |
| *F04D 13/12* | (2006.01) |
| *F04D 17/12* | (2006.01) |
| *F04B 25/00* | (2006.01) |
| *F04B 41/06* | (2006.01) |
| *F25B 1/00* | (2006.01) |
| *F04B 39/16* | (2006.01) |
| *F04D 25/16* | (2006.01) |

(52) U.S. Cl.
CPC .............. *F04D 13/12* (2013.01); *F04D 17/12* (2013.01); *F04D 25/16* (2013.01); *F04D 29/002* (2013.01); *F04D 29/5833* (2013.01); *F04D 29/5866* (2013.01); *F25B 30/06* (2013.01); *F25B 1/00* (2013.01); *F25B 2400/061* (2013.01)

(58) Field of Classification Search
CPC .................. F25B 2400/13; F25B 9/008; F25B 2400/072; F25B 40/00; F25B 2400/23; F25B 1/04; F25B 2309/06; F25B 25/005; F25B 30/02; F25B 31/002; F25B 40/04; F25B 41/39; F25B 43/02; F25B 9/004; F25B 13/00; F25B 2400/01; F25B 2400/16; F25B 2600/17; F25B 2600/2509; F25B 2700/21152; F25B 31/006; F25B 40/02; F25B 45/00; F25B 49/022; F25B 11/00; F25B 11/02; F25B 11/04; F25B 1/00; F25B 21/00; F25B 21/04; F25B 2339/041; F25B 2339/047; F25B 2341/0012; F25B 2341/0014; F25B 2341/0015; F25B 2400/04; F25B 2400/0411; F25B 2400/14; F25B 2400/15; F25B 2500/17; F25B 2600/02; F25B 2600/025; F25B 2600/0253; F25B 2600/026; F25B 2700/19; F25B 27/00; F25B 30/00; F25B 31/008; F25B 39/028; F25B 41/00; F25B 41/22; F25B 41/385; F25B 49/027; F25B 5/02; F25B 7/00
USPC .................................. 417/248, 243, 108–117
See application file for complete search history.

(56) References Cited

U.S. PATENT DOCUMENTS

| | | | | |
|---|---|---|---|---|
| 1,339,137 A * | 5/1920 | Rogers | ..................... | F04F 1/18 |
| | | | | 417/108 |
| 2,280,845 A | 4/1942 | Parker | | |
| 2,725,181 A * | 11/1955 | Lamberton | ............. | F04B 35/06 |
| | | | | 417/27 |
| 2,849,173 A * | 8/1958 | Surdy | ................ | F02B 29/0406 |
| | | | | 417/203 |
| 3,014,639 A * | 12/1961 | Gwinner | ................ | F04D 17/12 |
| | | | | 417/243 |
| 3,232,524 A * | 2/1966 | Rice | ................... | F04B 45/0533 |
| | | | | 417/246 |
| 3,375,664 A * | 4/1968 | Wells, Jr. | ................... | F02C 1/10 |
| | | | | 310/11 |
| 3,601,979 A * | 8/1971 | Singer | ..................... | F03B 17/02 |
| | | | | 60/326 |
| 3,608,311 A | 9/1971 | Roesel, Jr. | | |
| 3,988,897 A * | 11/1976 | Strub | ........................ | F02C 6/16 |
| | | | | 60/682 |
| 4,097,202 A * | 6/1978 | Price | ........................ | F04B 25/02 |
| | | | | 417/243 |
| 4,135,364 A * | 1/1979 | Busick | ................... | F03B 17/005 |
| | | | | 290/54 |
| 4,326,132 A * | 4/1982 | Bokel | ..................... | F03B 17/02 |
| | | | | 290/1 R |
| 4,742,242 A * | 5/1988 | De Shon | ................... | F03B 17/02 |
| | | | | 290/1 R |
| 4,767,938 A * | 8/1988 | Bervig | ................... | F03B 17/005 |
| | | | | 290/1 R |
| 4,800,727 A * | 1/1989 | Petrick | ..................... | F01K 27/00 |
| | | | | 310/11 |
| 4,947,655 A * | 8/1990 | Shaw | ......................... | F25B 1/10 |
| | | | | 62/200 |
| 5,461,861 A * | 10/1995 | Wenzel | .................. | F01K 23/065 |
| | | | | 417/380 |
| 5,899,066 A * | 5/1999 | Brassea-Flores | ........ | F03B 17/02 |
| | | | | 60/496 |
| 6,203,285 B1* | 3/2001 | Wagner | .................... | F04B 25/00 |
| | | | | 417/243 |
| RE37,603 E | 3/2002 | Coney | | |
| 6,447,243 B1* | 9/2002 | Kittle | ..................... | F03B 17/02 |
| | | | | 415/92 |
| 6,695,591 B2* | 2/2004 | Grimmer | ................. | F04B 25/00 |
| | | | | 417/203 |
| 7,222,487 B1* | 5/2007 | Hinkley | ................ | F03B 17/005 |
| | | | | 290/43 |
| 8,008,796 B2* | 8/2011 | Muchow | ................. | F03D 13/20 |
| | | | | 290/54 |
| 8,397,496 B2* | 3/2013 | Frank | ...................... | F03B 17/04 |
| | | | | 60/496 |
| 8,572,959 B2 | 11/2013 | Ingersoll et al. | | |
| 8,869,531 B2* | 10/2014 | Held | ........................ | F01K 3/185 |
| | | | | 60/651 |
| 10,543,737 B2* | 1/2020 | Kujak | ..................... | B60H 1/323 |
| 2003/0175128 A1* | 9/2003 | Fabry | ...................... | F04D 25/00 |
| | | | | 417/243 |
| 2003/0192338 A1* | 10/2003 | Manohar | ............... | F25B 31/006 |
| | | | | 62/498 |
| 2004/0011038 A1* | 1/2004 | Stinger | .................... | F01K 25/08 |
| | | | | 60/651 |
| 2005/0189888 A1* | 9/2005 | Federman | ............. | H02M 7/493 |
| | | | | 318/67 |
| 2007/0065300 A1* | 3/2007 | Mariani | .................. | F04D 17/12 |
| | | | | 417/243 |
| 2008/0008602 A1* | 1/2008 | Pozivil | ...................... | F17C 9/00 |
| | | | | 417/243 |
| 2008/0303282 A1* | 12/2008 | Ziegenfuss | ........... | F03B 17/005 |
| | | | | 290/52 |
| 2009/0257902 A1* | 10/2009 | Ernens | .................... | F04B 35/00 |
| | | | | 418/201.1 |
| 2009/0297368 A1* | 12/2009 | Knox | ...................... | F04B 39/06 |
| | | | | 417/243 |
| 2010/0032133 A1* | 2/2010 | Lifson | ...................... | F25B 9/008 |
| | | | | 165/62 |
| 2010/0077788 A1* | 4/2010 | Lewis | ..................... | F25B 13/00 |
| | | | | 62/324.6 |
| 2010/0146961 A1* | 6/2010 | Silva | ......................... | F03B 17/04 |
| | | | | 60/495 |
| 2010/0319346 A1* | 12/2010 | Ast | ........................ | F01K 23/065 |
| | | | | 60/616 |
| 2010/0326100 A1* | 12/2010 | Taras | ......................... | F25B 1/10 |
| | | | | 62/115 |
| 2011/0120157 A1* | 5/2011 | Wohlert | .................. | F25B 15/02 |
| | | | | 62/101 |
| 2011/0201699 A1* | 8/2011 | Lucas | .................... | C07C 29/1518 |
| | | | | 518/702 |
| 2012/0087810 A1* | 4/2012 | Peussa | .................... | F04D 17/12 |
| | | | | 417/338 |
| 2012/0100015 A1* | 4/2012 | Kim | ....................... | F25J 3/04957 |
| | | | | 417/244 |
| 2012/0117988 A1* | 5/2012 | Mitra | ......................... | F25B 1/10 |
| | | | | 62/115 |

(56) References Cited

U.S. PATENT DOCUMENTS

| | | | | |
|---|---|---|---|---|
| 2012/0174605 A1* | 7/2012 | Huff | ............ | F28D 7/08 |
| | | | | 62/120 |
| 2013/0031934 A1* | 2/2013 | Huff | ............ | F25B 1/10 |
| | | | | 62/510 |
| 2013/0055756 A1* | 3/2013 | Tsutsumi | ............ | B01D 53/1425 |
| | | | | 62/617 |
| 2013/0098102 A1* | 4/2013 | Nakayama | ............ | F25B 30/02 |
| | | | | 62/510 |
| 2013/0129531 A1* | 5/2013 | Baker | ............ | F04D 29/5826 |
| | | | | 417/243 |
| 2014/0197642 A1* | 7/2014 | Daya | ............ | F03B 17/04 |
| | | | | 290/1 D |
| 2014/0250879 A1* | 9/2014 | Moncada | ............ | F03B 17/005 |
| | | | | 60/495 |
| 2015/0159919 A1* | 6/2015 | Sato | ............ | F25B 30/02 |
| | | | | 62/498 |
| 2016/0185473 A1* | 6/2016 | Zucchini | ............ | F04B 25/00 |
| | | | | 417/53 |
| 2016/0187893 A1* | 6/2016 | Bergh | ............ | F04D 27/0246 |
| | | | | 137/14 |
| 2016/0327049 A1* | 11/2016 | Dinsdale | ............ | F04D 17/12 |
| 2017/0268498 A1 | 9/2017 | Kasahara | | |

FOREIGN PATENT DOCUMENTS

| | | |
|---|---|---|
| FR | 2919716 A1 | 2/2009 |
| WO | WO2017125276 | 7/2017 |

\* cited by examiner

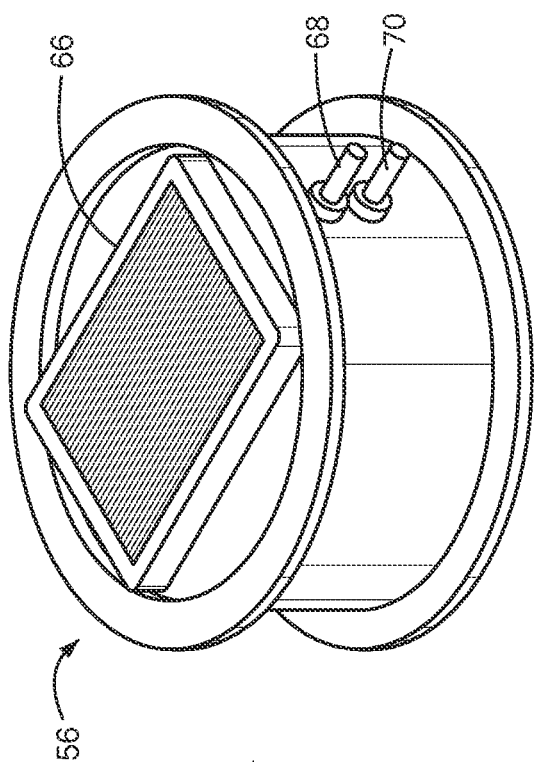
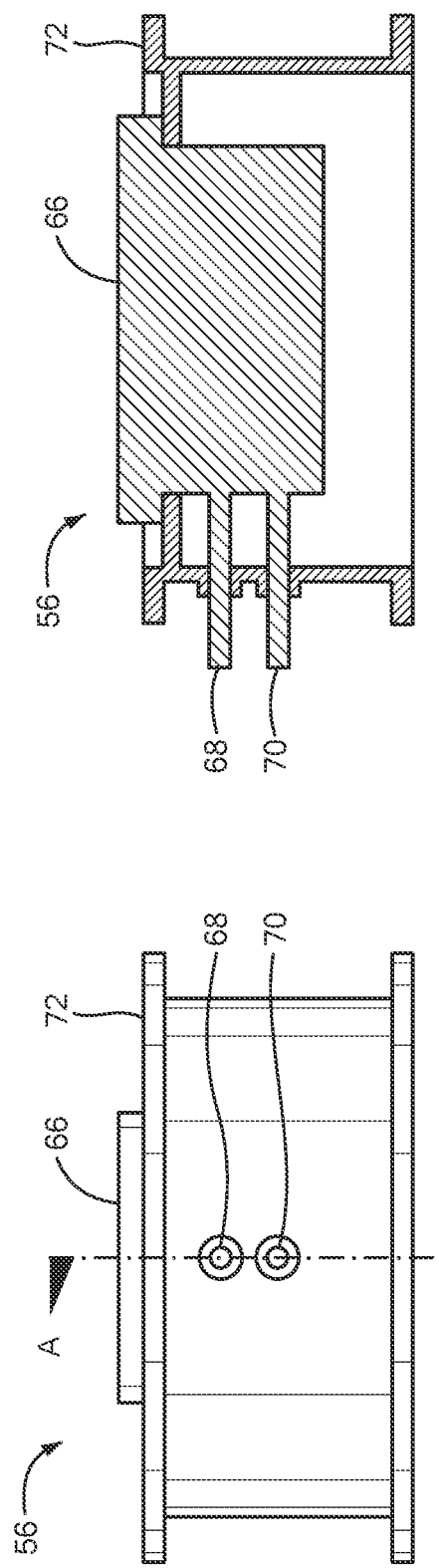
FIG. 4A
FIG. 4B
FIG. 4C

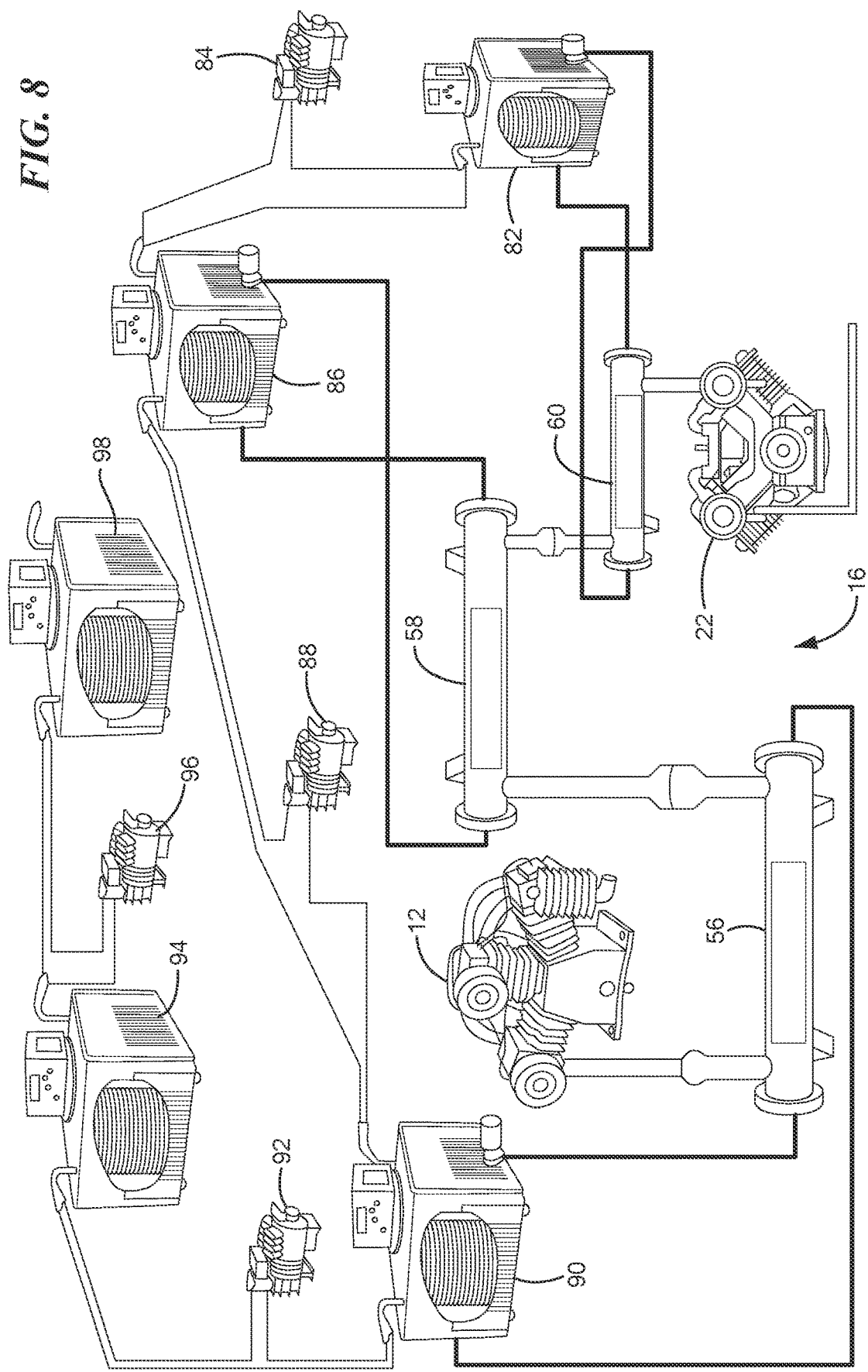

GASEOUS FLUID COMPRESSION WITH ALTERNATING REFRIGERATION AND MECHANICAL COMPRESSION USING A FIRST AND SECOND BANK OF COMPRESSION COUPLED WITH FIRST AND SECOND CASCADING HEAT PUMP INTERCOOLERS HAVING A HIGHER AND A LOWER TEMPERATURE SECTION

RELATED APPLICATION

This application claims priority to Provisional Application No. 62/618,720, filed Jan. 18, 2018, which is incorporated herein by reference.

FIELD OF THE INVENTION

The present invention relates generally to systems and method for the compression of gases. More particularly, disclosed herein are a compression system and method for air and other gaseous fluids wherein compression by operation of mechanical compressors is alternated with heat removal and backpressure reduction by refrigerant heat pump operation.

BACKGROUND OF THE INVENTION

For many decades, the need for realizing increased efficiency in gaseous fluid compression has been well recognized. There have been numerous attempts at achieving improved thermodynamic performance and elegance in construction in the provision of systems and methods for compressing gaseous fluids. Knowledgeable scientists and skilled inventors have endeavored to harness the principles of thermodynamics to provide for the compression of gases, such as air, with improved efficiency thereby to enable the conservation of energy and the overall advance of the art.

In 1938, for instance, H. F. Parker filed what became U.S. Pat. No. 2,280,845 for an Air Compressor System. There, Parker sought to approach the ideal isothermal cycle more closely than was previously practicable and, in so doing, to reduce the power consumption necessary for a given output. Parker proposed to intermix a non-compressible, heat-absorbing, and heat-carrying medium, namely water in mist form, with compressed gas to reduce the temperature of the compressed gas thereby to approach an ideal isothermal cycle. After compression, Parker taught to separate and remove the heat-carrying water and with it the greater part of the heat deriving from compression from the compressed gas.

More recently, with U.S. Pat. No. 8,572,959, Ingersoll et al. describes Systems, Methods and Devices for the Management of Heat Removal within a Compression and/or Expansion Device or System. Under the Ingersoll et al. system, liquid is moved into a pressure vessel to compress gas within the pressure vessel. During the compression and/or expansion process, heat is transferred to the liquid used to compress the air, and a liquid purge system removes at least a portion of the liquid to which the heat energy has been transferred. The liquid can be cooled and then recycled within the system.

These and other systems and methods for the compression of gaseous fluids model the principles of thermodynamics. Heat pumps and refrigeration systems rely on the thermodynamic cycles of heat pumping and refrigeration. In a heat pump, heat is moved from the source location to another location, a heat sink, using mechanical work or a heat source. In a heater, the heat sink is warmed. In refrigeration, the objective is to cool the source of heat.

Sadi Carnot mathematically set forth the principle of the refrigeration cycle in 1824. A heat pump or heat engine operates in reverse of the refrigeration cycle. The heat pump and refrigeration cycles are commonly classified into vapor absorption, vapor compression, the gas cycle, or the Stirling cycle.

In an ideal vapor compression cycle, a refrigerant working fluid enters a compressor in vapor form and is compressed at constant entropy before exiting the compressor superheated. A condenser receives the superheated vapor, cooling the vapor and condensing it into a liquid by removing additional heat at constant pressure and temperature. The liquid refrigerant then goes through a decrease in pressure as it passes through an expansion valve causing refrigeration and resulting in a mixture of liquid and vapor at lower temperature and pressure. That mixture is vaporized through coils or tubes of an evaporator by the cooling of warm air from the space being refrigerated as it is blown by a fan across the evaporator coil or tubes. The thermodynamic cycle is completed as the resulting refrigerant vapor returns to the compressor inlet. The vapor absorption cycle is similar to the vapor compression cycle. However, the compressor is replaced by an absorber that dissolves the refrigerant in a suitable liquid. A liquid pump raises pressure, and a generator drives the refrigerant vapor from the high-pressure liquid. In the ideal Stirling cycle heat engine, mechanical work drives heat transfer in a reversed direction. In a reversed Carnot cycle, four reversible processes formed by two isothermal steps and two isentropic steps are performed in reverse. Finally, in the gas cycle, a gaseous working fluid is compressed and expanded but does not change phase.

The coefficient of performance (COP) is a measure of the efficiency of a refrigerator or heat pump. The coefficient of performance is an instantaneous measurement of the ratio between useful cooling or heating output to power input. In a refrigeration system, the coefficient of performance can be defined as the ratio of the heat removed in relation to the power input to the compressor. The coefficient of performance in heating can be defined as the ratio of the heat delivered to the power input to the compressor. Accordingly, a higher coefficient of performance denotes a more efficient system.

Like any other system relying on the relationship between heat and other forms of energy, the coefficient of performance of any gaseous compression system is inherently constrained by the Laws of Thermodynamics. Each inventor seeking to advance the art of gaseous compression has sought to minimize losses in efficiency while maximizing the efficacy of the components and processes involved thereby to achieve optimal coefficients of performance.

Accordingly, despite the foregoing and many other useful improvements in relation to the compression of gases, the drive continues for improved efficiencies in systems and methods for the compression of gaseous fluids. In this regard, it is recognized that refrigeration is an efficient method for facilitating the compression of gases. However, it is further recognized that refrigeration has a relatively narrow temperature range over which it works with high efficiency. Additional cooling beyond a low point of that temperature range can be carried out only with drastically reduced efficiency.

The present inventor has thus appreciated that it would be highly advantageous to provide a system and method for gaseous fluid compression that minimizes losses in performance during fluidic compression and that exploits the efficiencies of refrigeration.

SUMMARY OF THE INVENTION

The present invention is thus founded on the basic object of providing a system and method for the compression of gases with improved efficiency.

A related object of the invention is to provide a system and method for compressing gas that is operative with reduced power consumption.

A further object of the invention is to provide a system and method for compressing gas with the removal of heat at a high coefficient of performance (COP).

An additional object of embodiments of the invention is to provide a system and method for gaseous fluid compression that is scalable.

These and further objects and advantages of the present invention will become obvious not only to one who reviews the present specification and drawings but also to those who have an opportunity to witness the gaseous fluid compression system and method disclosed herein in operation. Although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, a gaseous fluid compression system for compressing a gas from an initial pressure to an exit pressure according to the invention has a first compression bank and a second compression bank. The first compression bank comprises a stage of gaseous compression with a gaseous fluid compressor and a heat pump intercooler fluidically coupled to the gaseous fluid compressor. The first compression bank is operative to bring the gas from an intake pressure to a first elevated gauge pressure. The second compression bank comprises a stage of gaseous compression with a gaseous fluid compressor and a heat pump intercooler fluidically coupled to the gaseous fluid compressor. The second compression bank is operative to bring the gas to the exit pressure. The exit pressure is greater than the first elevated gauge pressure.

In practices of the gaseous compression system, the heat pump intercooler comprises a cascading heat pump intercooler with plural intercooler sections. For example, the cascading heat pump intercooler can have a high temperature section and a low temperature section, each of the high temperature section and the low temperature section having an intercooler core. The cascading heat pump intercooler can further comprise a medium and potentially further temperature sections fluidically interposed between the high temperature section and the low temperature section. Further, a water trap can be fluidically coupled to each heat pump intercooler to be operative to remove condensed water.

As taught herein, the first compression bank can comprise a blower compression bank. The gaseous fluid compressor of the stage of gaseous compression of the first compression bank can comprise a high-pressure blower, and the second compression bank can comprise a mechanical compression bank. The gaseous fluid compressor of the stage of gaseous compression of the mechanical compression bank can be a mechanical compressor, such as a rotary compressor or a reciprocating compressor.

It is further disclosed that the blower compression bank can be formed by plural stages of gaseous compression with each stage having a high-pressure blower gaseous fluid compressor and a heat pump intercooler fluidically coupled to the high-pressure blower gaseous fluid compressor. In a similar manner, the mechanical compression bank can have plural stages of gaseous compression wherein each of the plural stages has a mechanical gaseous fluid compressor and a heat pump intercooler fluidically coupled to the mechanical gaseous fluid compressor. For example, the blower compression bank can have at least four stages of gaseous compression, each stage with a high-pressure blower gaseous fluid compressor and a heat pump intercooler fluidically coupled to the high-pressure blower gaseous fluid compressor. The mechanical compression bank can have at least three stages of gaseous compression, each stage with a mechanical gaseous fluid compressor and a heat pump intercooler fluidically coupled to the mechanical gaseous fluid compressor.

The gaseous compression system can further include an outlet. A final stage of gaseous compression can have a mechanical gaseous fluid compressor without a heat pump intercooler fluidically interposed between the mechanical gaseous fluid compressor and the outlet.

It is disclosed still further that a gas-driven generator can be fluidically coupled to the outlet to permit the generation of electric power from movement of a working fluid by injection of compressed gas received from the gaseous compression system. For example, the gas-driven generator can have one or more elongate gravitational distribution conduits, each gravitational distribution conduit with an upper end and a lower end. The generator can have one or more elongate buoyancy conduits, each buoyancy conduit with an upper end and a lower end. The upper end or ends of the buoyancy conduits are in fluidic communication with the upper end or ends of the gravitational distribution conduits, and the lower end or ends of the gravitational distribution conduits are in fluidic communication with the lower end or ends of the buoyancy conduits. With that, a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits. A fluid turbine system is fluidically interposed between the lower end or ends of the gravitational distribution conduit or conduits and the lower end or ends of the buoyancy conduits. A gaseous injection system is operative to inject gas, such as air, compressed by the gaseous compression system from the outlet and into each of the buoyancy conduits.

One will appreciate that the foregoing discussion broadly outlines certain more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention. It will thus be clear that additional features and benefits of the invention will be apparent through a reading of the detailed description of implementations and embodiments, which are without restriction, and by reference to the attached figures.

BRIEF DESCRIPTION OF DRAWINGS

Additional details and features of the gaseous fluid compression system and method disclosed herein will be apparent to one skilled in the art after reviewing the present specification and drawings, wherein:

FIG. 4A is a perspective view of an intercooler of a stage of the system;

FIG. 4B is a view in side elevation of the intercooler;

FIG. 4C is a cross-sectional view of the intercooler;

FIG. 8 is a perspective view of subsystems for enabling added efficiency in a gaseous compression system according to the invention.

DETAILED DESCRIPTION OF PREFERRED EMBODIMENTS

The gaseous fluid compression system and method disclosed herein are subject to varied embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

Figure 1:
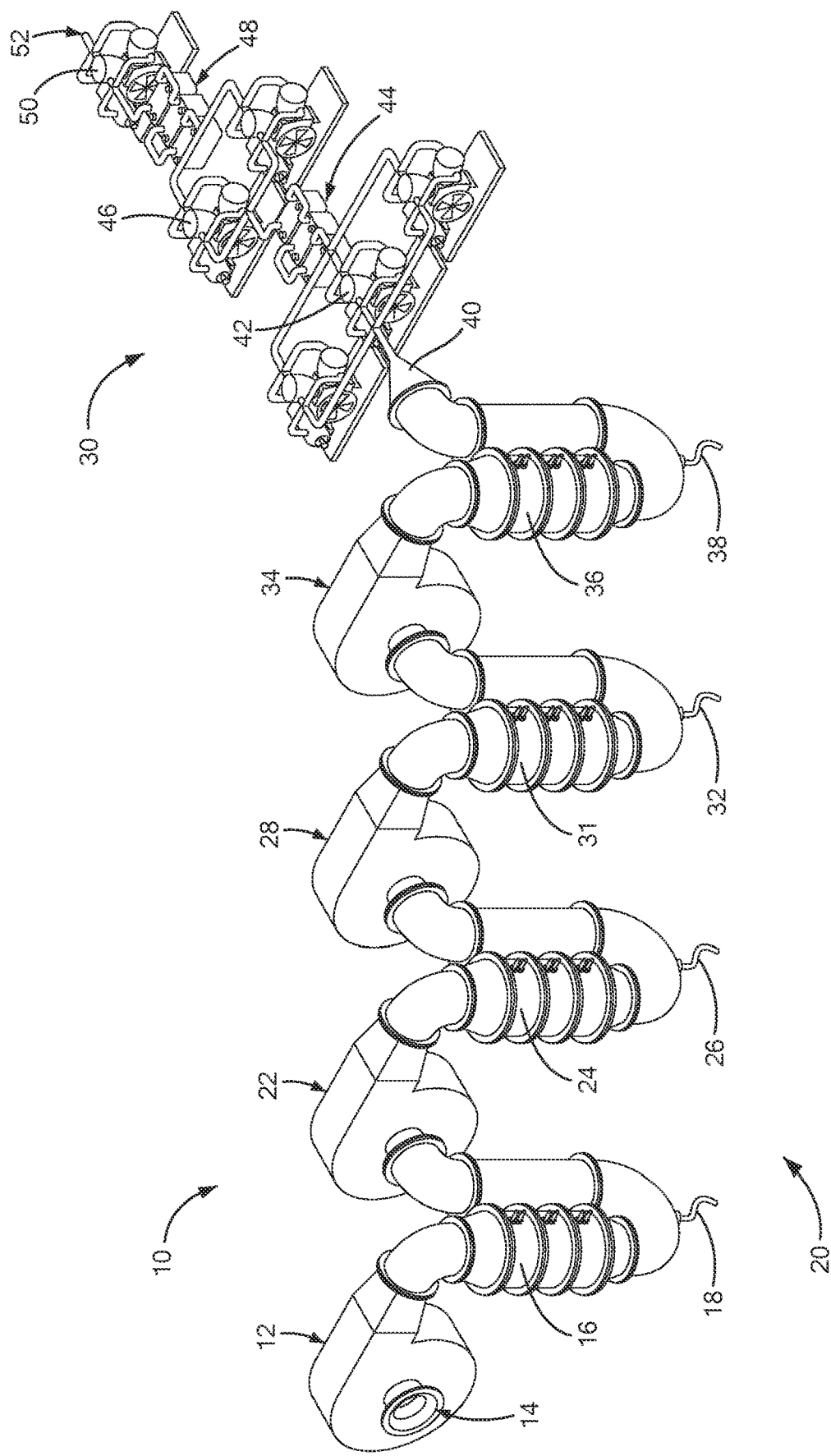
FIG. 1 is a perspective view of a gaseous compression system according to the invention.
Figure 5:
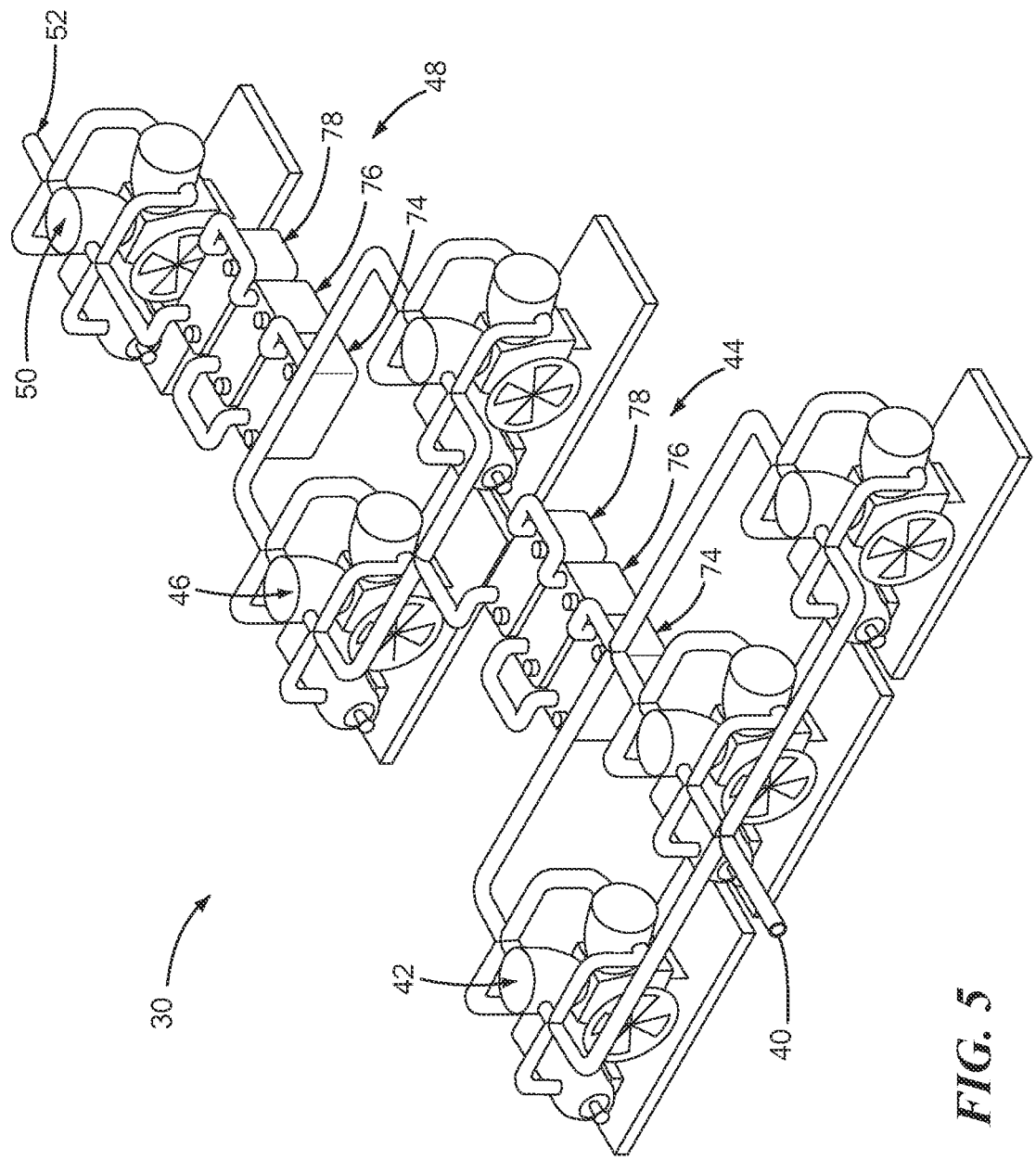
FIG. 5 is a perspective view of the mechanical compression bank of the gaseous compression system.
Figure 6B:
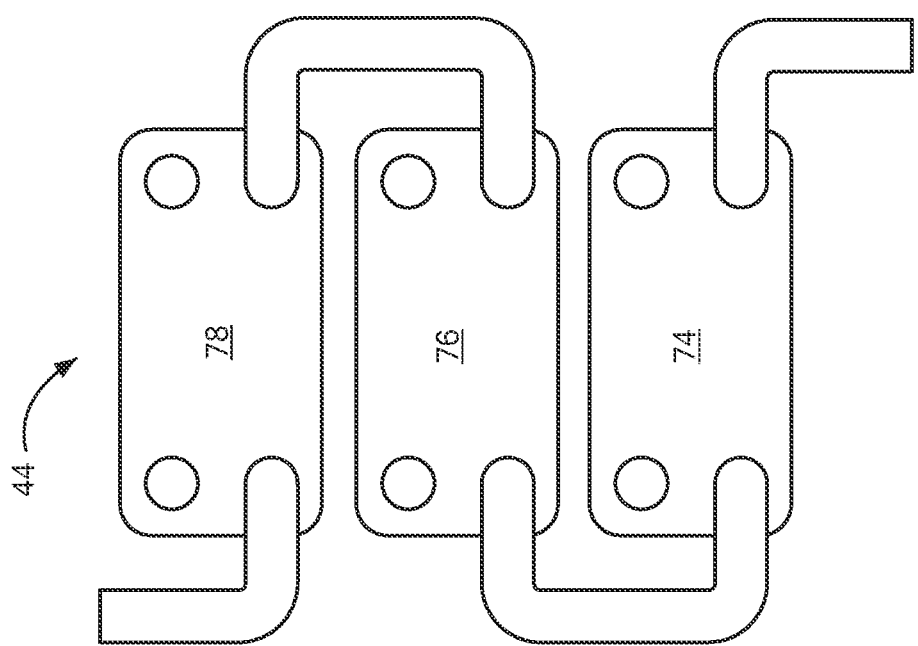
FIG. 6B is a top plan view of the cascading heat pump intercooler.
Figure 6A:
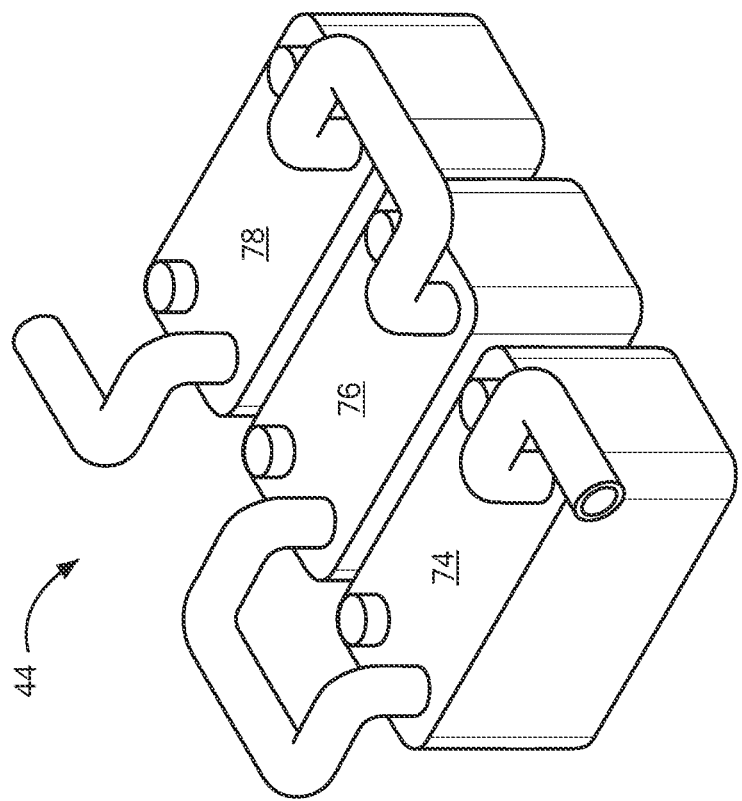
FIG. 6A is a perspective view of a cascading heat pump intercooler.

Looking more particularly to FIG. 1, the gaseous compression system 10 has a first compression bank 20 for raising the gauge pressure of gas within the system 10 to a first level of compression and a second compression bank 30 for raising the gauge pressure of gas within the gaseous compression system 10 beyond the first level of compression to a final exit pressure. According to the present invention, the first compression bank 20 can comprise a blower compression bank 20, and the second compression bank 30 can comprise a mechanical compression bank 30. The blower compression bank 20 is depicted apart in FIG. 2, and the mechanical compression bank 30 is depicted apart in FIG. 5. Herein, the gas may at times be referred to as air with it being understood that the compression of other gases is possible within the scope of the invention.

According to one practice of the gaseous compression system 10, the blower compression bank 20 can be calculated to bring the gas, such as air, drawn or input into the system from a first pressure, such as ambient pressure, to an elevated gauge pressure, such as 20 psi to 24 psi. The mechanical compression bank 30 can be employed to achieve compression therebeyond to reach the exit pressure.

In this illustrative but not limiting example, air is drawn into the first compression bank 20 of the gaseous compression system 10 at a gauge pressure of 0 psi and at ambient temperature. In a first stage of the system 10 within the blower compression bank 20, a high-pressure blower 12 intakes air through an air intake 14 and compresses the air to a first elevated pressure that can be dependent on the configuration of compression system 10 and other factors. That fluidic compression releases adiabatic heat and raises the temperature of the now compressed air. The total amount of energy required to complete this process corresponds to the force of the pressure of the air plus the adiabatic heat plus the latent heat of forced condensation of water vapor in the air.

A cascading heat pump intercooler 16 is disposed secondary to the high-pressure blower 12 within the first stage of the blower compression bank 20 of the gaseous compression system 10 to receive pressurized air from the high-pressure blower 12. The heat pump intercooler 16 removes the adiabatic heat of compression plus latent heat and reduces the temperature of the pressurized air thereby lowering the energy needed to compress the air further. That lowered temperature results in a lower pressure exiting the first stage. In embodiments of the system 10, for instance, the temperature is calculated to be lowered to below the original ambient temperature.

The blower compression bank 20 has a second stage of the gaseous compression system 10 with a high-pressure blower 22 that receives air compressed and cooled in the first stage of the blower compression bank 20. As a result of the intercooler 16, the high-pressure blower 22 of the second stage requires less energy to carry out compression since the blower 22 is not required to overcome released adiabatic heat and because the temperature of the compressed gas received is lower than the original, ambient temperature. A cascading heat pump intercooler 24 is disposed secondary to the high-pressure blower 22 within the second stage of the blower compression bank 20 of the gaseous compression system 10 to receive pressurized air from the high-pressure blower 22. Due to cooling provided by the intercooler 16 of the first stage of the gaseous compression system 10, the energy needed to remove the adiabatic heat by the heat pump intercooler 24 of the second stage is far less than with only mechanical compression of the air by the blowers 12 and 22.

Because the high efficiency of a single heat pump spans only a very narrow range of temperature, cascading heat pump intercoolers 16, 24 are employed in practices of the gaseous compression system 10 to permit operation over narrower ranges of operation and to provide improved efficiency in operation of the heat pump intercoolers 16, 24. Background regarding cascading heat pumps may be had by reference, for example, to U.S. Patent Application Publication No. 2010/0077788 of Lewis for a Cascading Air-Source Heat Pump, U.S. Pat. No. 8,869,531 to Held for Heat Engines with Cascade Cycles, and U.S. Patent Application Publication No. 2004/0011038 of Stringer et al. for Cascading Closed Loop Cycle Power Generation. Each of the foregoing and each reference cited therein are incorporated herein by reference.

Figure 3C:
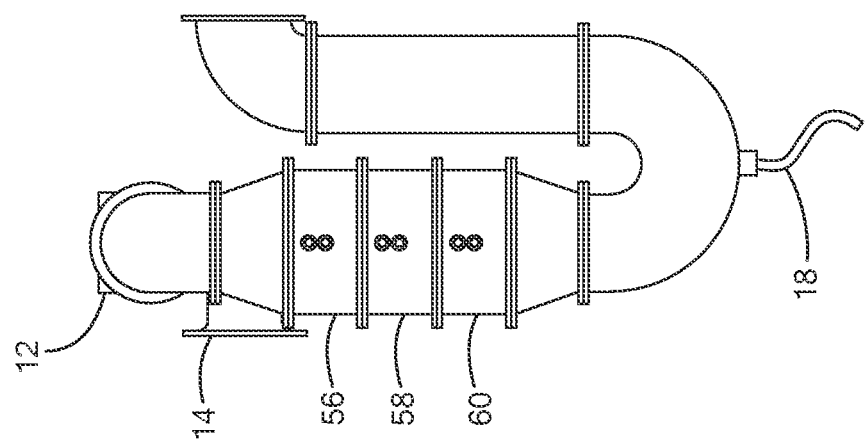
FIG. 3C is a view in front elevation of the high-pressure blower and cascading heat pump intercooler of a stage of the blower compression bank.
Figure 3B:
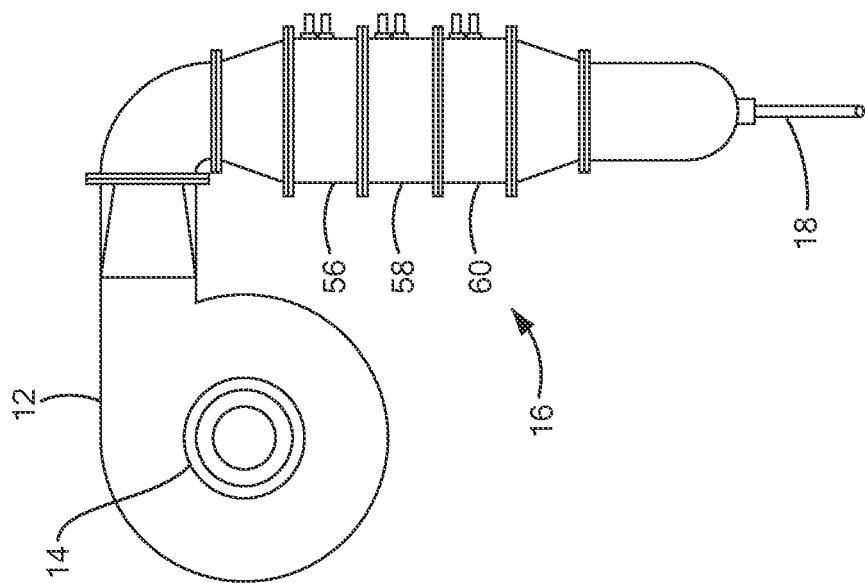
FIG. 3B is a view in side elevation of the high-pressure blower and cascading heat pump intercooler of a stage of the blower compression bank.
Figure 3A:
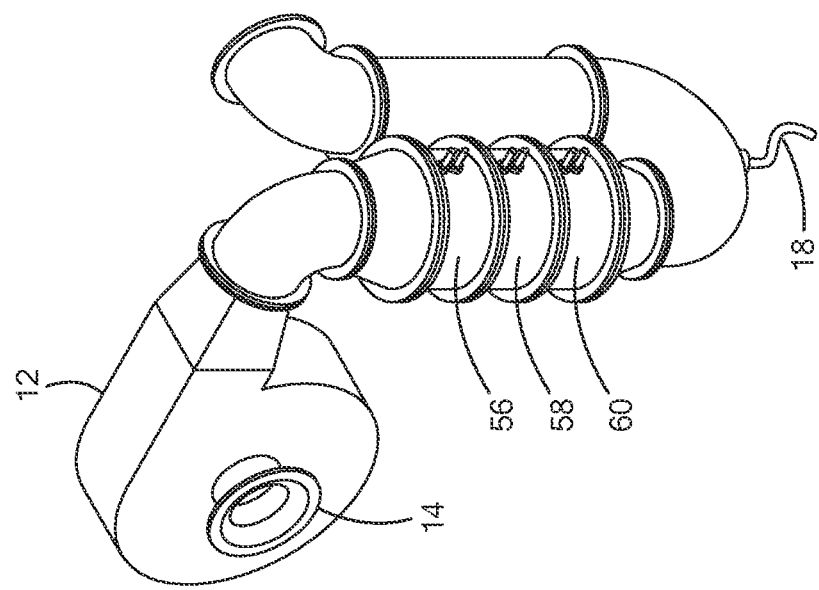
FIG. 3A is a perspective view of a high-pressure blower and cascading heat pump intercooler of a stage of the blower compression bank.

According to the invention and with further reference to FIGS. 3A through 3C where the first stage intercooler 16 is shown, each cascading heat bank intercooler employed can be considered to have a high temperature section 56, a medium temperature section 58, and a low temperature section 60. The sections 56, 58, and 60 of the intercooler 16 can be within one intercooler structure. Alternatively, each section can itself be formed from what could be considered and operative as a separate intercooler. As used herein, reference to an intercooler and sections of an intercooler should be understood to include unitary and separate intercooler structures except as the invention may be expressly limited by the claims. The intercoolers 16, 24, 30, and 36 and the intercooler sections 56, 58, and 60 could be designed and, additionally or alternatively, calibrated for the temperature range over which the heat pump is expected to operate.

A further understanding of potential manifestations of the intercoolers 16, 24, 31, and 36 can be understood with reference to FIGS. 4A through 4C where the high temperature section 56 of the first stage cascading heat pump intercooler 16 is depicted. There, the intercooler section 56, which forms an independently operable intercooler heat exchanger, has an intercooler core 66 with a gaseous fluid inlet 68 and a gaseous fluid outlet 70. The intercooler core 66 is retained within a housing 72. Under this construction, compressed fluid can be received from the high-pressure blower 12, intercooled, and then advanced, such as to the medium temperature intercooler section 58, then to the low temperature intercooler section 60, and then to the second stage of the gaseous compression system. The remaining intercoolers can be similarly operable or, potentially, differently constructed and operable.

The cascading heat pump intercoolers 16, 24, 31, and 36 avoid losses in efficiency as would otherwise result from being required to condense heat at high delta temperatures. In the cascading heat pump intercoolers 16, 24, 31, and 36 employed hereunder, lower temperature heat pumps use the next higher temperature-cooling bath unit as a basis for its respective condensing temperature. In this way, the heat pumps within the intercoolers 16, 24, 31, and 36 cooperate individually to move very large volumes of heat with minimized individual heat transfer requirements and without individually exhibiting large efficiency losses.

Subsystems for further managing, harvesting, and exploiting can be had with further reference to the schematic diagram of FIG. 8, which provides a further understanding regarding high efficiencies that can be achieved in particular practices of the invention. There, temperature variations and deltas are leveraged and limited by using heat pump chilling baths, such as of the chilling baths of higher temperature heat pumps. As used hereunder, heat pumps can collect heat, including latent heat and frictional heat, and transfer it for alternative or subsequent use. The heat can be used in a subsequent or parallel operation that can use the low grade heat to perform another task requiring energy input. With that, the transferred energy is effectively used multiple times, such as once to compress the air and a second time to heat a further operation. The further operation could, for example, be space heating, water heating, Organic Rankin Cycle power generation, or some other operation or combination thereof.

As in FIG. 8, energy harvesting, management, and exploitation subsystems can be interposed within the alternating refrigeration and compression stages of the gaseous compression system 10. For example, using the first stage of the system 10 as a non-limiting example, a low-temperature chiller bath 82 can thermodynamically interact with the low temperature section 60 of the respective intercooler 16 with the bath fluid conveyed over the low temperature section 60 of the intercooler 16. The chiller bath 82 can have a bath temperature above the freezing point of water, such as 33° F., to avoid condensed water from freezing on the coils of the chiller bath 82. A low temperature heat pump 84 is fluidically coupled to the chiller bath 82. The heat pump 84 might normally have to condense the refrigerant at ambient temperatures in air that could be as high as 100° F. while the ability of air to transfer heat is low thereby requiring higher delta condenser temperatures to complete the efficient transfer of heat. Such higher delta temperatures would lower the COP of the heat pump drastically. To avoid the drawbacks of high delta ambient air-cooled condensers, the low temperature heat pump 84 uses a condensing medium from a medium temperature chiller bath 86. This keeps the delta temperature to approximately 30° F. Additionally, the low temperature heat pump 84 is now exchanging heat in a liquid medium, which requires lower delta temperatures to be efficient. This keeps the COPs of the low temperature heat pump 84 very high.

The medium temperature chiller bath 86 is fluidically coupled to the low-temperature chiller bath 82 with a bath temperature at, for example, about 60° F. A medium temperature heat pump 88 is fluidically coupled to the chiller bath 86. The medium temperature chiller bath 86 can interact thermodynamically with the medium temperature section 58 of the respective intercooler 16 by having the bath fluid conveyed over the medium temperature section 58 of the intercooler 16. The heat pump 88 again would normally have to condense the refrigerant at ambient temperatures in the air, which could be as high as 100° F., and it is again recognized that the ability of air to transfer heat is low requiring higher delta condenser temperatures to complete the efficient transfer of heat. Such higher delta temperatures would lower the COP of the heat pump drastically. To avoid the drawbacks of high delta ambient air-cooled condensers, the medium temperature heat pump 88 uses a high temperature chiller bath 90, which is thermodynamically engaged with the high temperature section 56 of the respective intercooler 16 with the bath fluid conveyed over the high temperature section 56 of the intercooler 16, as its condensing medium. This keeps the delta temperature to about 60° F. Additionally, the medium temperature heat pump 88 is thus exchanging heat in a liquid medium, which requires lower delta temperatures to be efficient. This keeps the COPs of the medium temperature heat pump 88 very high. After this section, the temperature has been raised, such as to 120° F.

The high temperature chiller bath 90 is fluidically coupled to the medium temperature heat pump 88 and has a bath temperature of approximately 120° F. corresponding to the high temperature section 56 of the intercooler 16. A high temperature heat pump 92, which is fluidically coupled to the high-temperature chiller bath 90, again would normally have to condense the refrigerant at ambient temperatures in the air, which could be as high as 100° F. Although the ambient temperature in this condenser is conducive to a high COP, the poor air exchange would require a higher delta temperature and require more energy. The higher delta temperatures would lower the COP of the heat pump 92 marginally. To avoid the drawbacks of high delta ambient air-cooled condensers, the high temperature heat pump 92 uses a high temperature boost chiller bath 94 as it condensing medium. This keeps the delta temperature to about 80° F. Additionally, the fluid is now at a temperature of a useable low grade heat that can be used for other heating operations. This keeps the COPs of the high temperature heat pump 92 very high. After this section, the temperature is further raised, such as to 200° F.

One or more additional boost heat pump cycles, each with a heat pump 96 and a chiller bath 98, can be added to elevate the temperature even more to improve the quality of the low-grade heat so it can be used in a greater variety of low-grade heat uses. In each booster cycle, the temperature can be further raised, such as by an additional 80° F. to 100° F. Under such methodology, one additional boost cycle can raise the temperature to, for instance, 290° F., and a second additional boost cycle can raise the temperature further, such as to 380° F. In such higher temperature boost cycles, condensing coils can be located in the actual end user task, such as in a gas-driven generator, a domestic hot water supply, in space heating needs, or otherwise.

Figure 2:
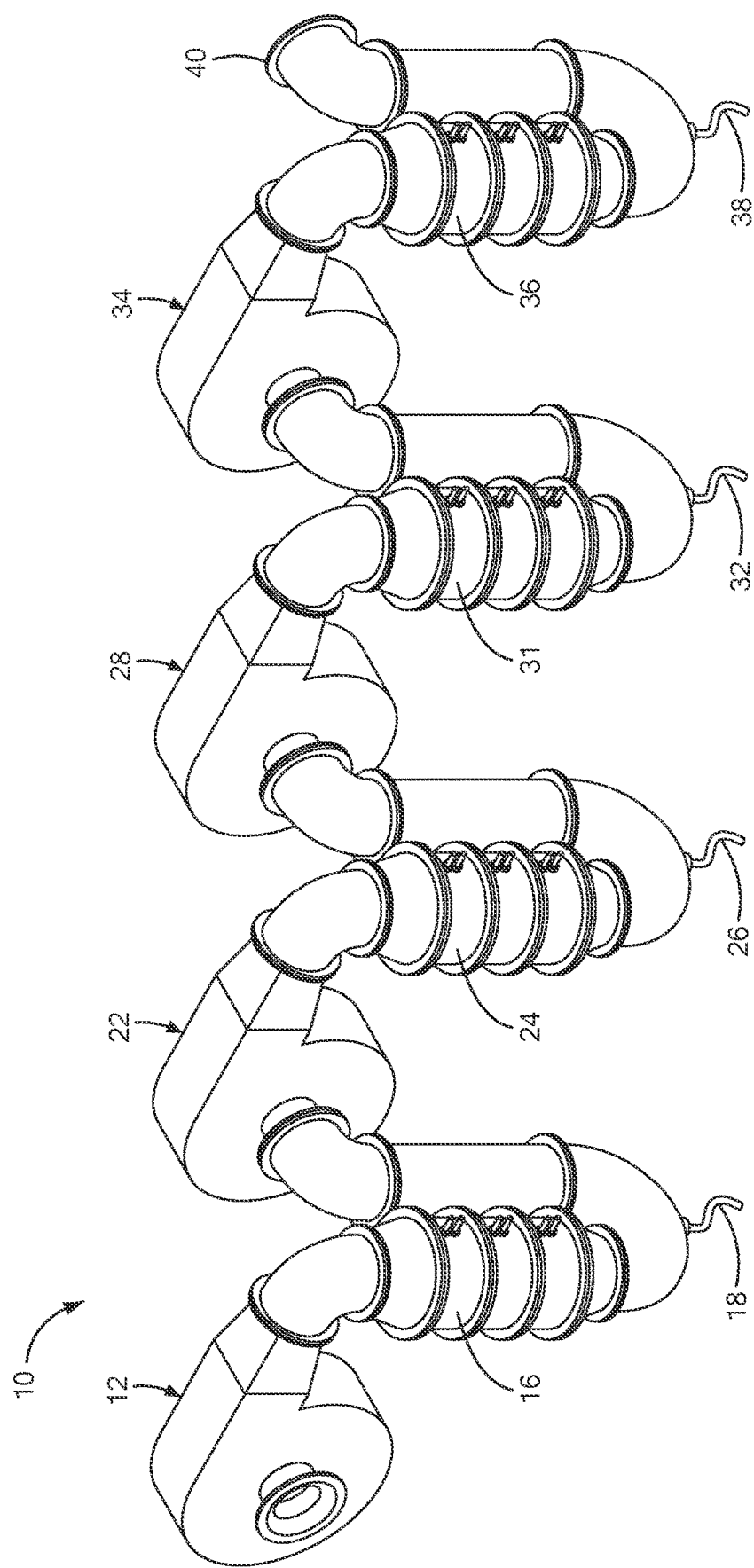
FIG. 2 is a perspective view of the blower compression bank of the gaseous compression system.

In any event and looking back to FIGS. 1 and 2, for example, the compression and intercooling steps are repeated in the present gaseous compression system 10, sequentially compressing the gas with intervening steps of harvesting heat through intercooling. In the depicted practice of the gaseous compression system 10, compression and intercooling are repeated in plural, particularly four, sequential stages within the blower compression bank 20 to bring the gas drawn or input into the system to an elevated first bank exit gauge pressure. It is to be noted that additional or fewer stages can be provided in the blower compression bank 20 with compression through blower compression and intercooling through intervening cascading heat pump intercooler in each of the several stages.

The blower compression bank 20 in this embodiment employs a third stage with a high-pressure blower 28 that receives air compressed and cooled in the second stage of the blower compression bank 20. The high-pressure blower 28 of the third stage imparts further compression of air received from the second stage, again requiring less energy to carry out compression since the blower 28 receives the air with lowered adiabatic heat due to operation of the cascading heat pump intercooler 24. A cascading heat pump intercooler 31 is disposed within the third stage of the blower compression bank 20 to receive pressurized air from the high-pressure blower 28

The prior art discloses high-pressure blower compression systems. Relevant teachings may be had in, for instance, U.S. Pat. No. 2,849,173 for a Compressor System, U.S. Pat. No. 3,014,639 for a High Pressure Air Compressor, U.S. Pat. No. 5,461,861 for a Process for Compressing a Gaseous Medium, U.S. Pat. No. 6,695,591 for a Multi-Stage Gas Compressor System, U.S. Patent Application Publication No. 2009/0257902 for a Compressor Device. All of these are incorporated herein by reference.

The high-pressure blowers 12, 22, 28, and 34 described herein could, by way of non-limiting example, comprise high-pressure centrifugal blowers. The first stage high-pressure blower 12 could, for instance, operate in a range of 4,500 to 20,000 CFM, and the second stage high-pressure blower 22 could operate, again for example, in a range of 4,500 to 20,000 CFM. These rates are expressed in atmospheric conditions. However, it is contemplated that blowers 22, 28, and 34 subsequent to the first blower 12 could operate at reduced flow rates, such as by roughly 25% less volume, due to increases in pressure and sub-ambient cooling. In theory, smaller blowers 22, 28, and 34 could be employed in later stages since the actual physical volume of air that must be passed is smaller while the air is pressurized. One effective high-pressure blower type, for example, is available as Type HP Pressure Blowers with radial high pressure wheel designs from the New York Blower Company of Willowbrook, Ill., USA.

In a fourth stage of the blower compression bank 20, a high-pressure blower 34 receives air compressed and cooled in the third stage. The high-pressure blower 34 of the fourth stage imparts further compression of air received from the third stage with less energy being required to carry out compression since the blower 34 receives the air with lowered adiabatic heat due to operation of the cascading heat pump intercooler 24. A cascading heat pump intercooler 36 is disposed within the fourth stage of the blower compression bank 20 to receive pressurized air from the high-pressure blower 34.

The present inventor has appreciated that, after one or more stages involving compression by blower compression, an elevated pressure of the compressed air will be reached beyond which compression by high-pressure blower becomes impractical and ineffective. According to the present system 10, further compression can be achieved by mechanical compression, such as by use of one or more reciprocating compressors. Intercooling by cascading heat pump intercooler can again be employed subsequent to each compression step. Thus, the high pressure blowers 12, 22, 28, and 34 of the blower compression bank 20 give way to stages of reciprocating mechanical compressors 42, 46, and 50 with intervening intercoolers 44 and 48 in the mechanical compressor bank 30. Beyond the first level of compression achieved by the blower compression bank 20, the reciprocating compressors 42, 46, and 50 raise gaseous pressure higher and more efficiently than blowers. The mechanical, in this case reciprocating compressors can be operative in the 150 to 300 CFM range. Because the gas is now compressed to a much smaller volume than the original air volume, fewer compressors 42, 46, and 50 may be employed to reach a desired final high pressure.

Within the mechanical compressor bank 30, compressed and intercooled air is received at a blower compressor bank exit pressure from the final intercooler 36 of the blower compressor bank 20 through a fluidic connector 40 and into a first mechanical compressor group 42 that forms a fifth stage of the gaseous compression system 10. The first mechanical compressor group 42 could include just a single mechanical compressor or multiple mechanical compressors. The mechanical compressors of the compressor groups 42, 46, and 50 could, for instance, comprise rotary compressors or reciprocating compressors. Three mechanical compressors operate in parallel in the first mechanical compressor group 42 in this depiction. The first mechanical compressor group 42 raises the gas to a further elevated pressure, and the received gas is elevated in temperature. That further pressurized gas is passed to a cascading heat pump intercooler 44 of the first stage of the first mechanical compressor group 42 to remove the heat of compression and to reduce the temperature of the pressurized air thereby lowering the energy needed to compress the air further.

The mechanical compression bank 30 in this embodiment has second and third mechanical compressor groups 46 and 50 that form sixth and seventh stages of the gaseous compression system 10. In the sixth stage, a second mechanical compressor group 46, which is formed by two mechanical compressors operating in parallel in this example, receives air compressed and cooled in the fifth stage of the mechanical compression bank 30. The mechanical compressor group 46 of the sixth stage imparts further compression of air received from the fifth stage, and a cascading heat pump intercooler 48 is disposed within the sixth stage of the mechanical compression bank 30 to receive pressurized air from the fifth stage compressor group 46. In a seventh and final stage of the gaseous compression system 10, the third mechanical compressor group 50, which is formed by a single mechanical compressor in this embodiment, receives air compressed and cooled in the sixth stage of the mechanical compression bank 30 and further compresses the gas before imparting the pressurized gas through an outlet 52.

Figure 7:
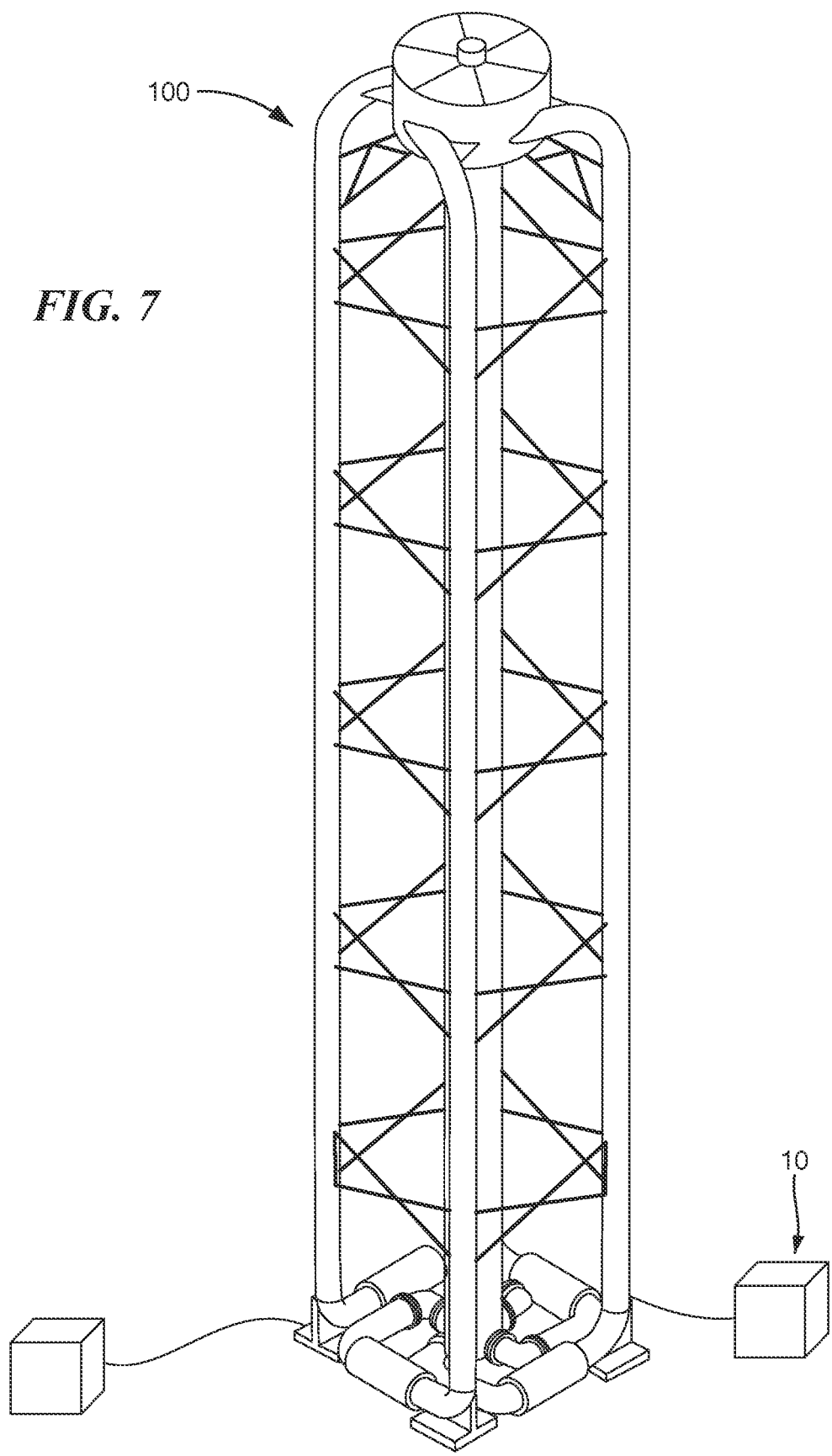
FIG. 7 is a perspective view of an air-driven generator exploiting a gaseous compression system according to the invention.

According to the invention and looking further to FIG. 7, the pressurization of the gas by the gaseous compression system 10 can be employed advantageously to drive further and larger systems. By way of example and not limitation, gas pressurized by the system 10 can be exploited as the pressurized gas operative to induce cyclic movement of the working fluid in the Air-Driven Generator 100 of the present inventor's copending U.S. application Ser. No. 16/115,531 and PCT International Application No. PCT/US18/48413, both filed Aug. 28, 2018. The entire disclosures of both such applications are incorporated herein by reference. In such exploitations of the gaseous compression system 10, it is possible that the gas may not be cooled by intercooling after the final stage, and the additional heat and resulting pressure may facilitate injection of the air into the buoyancy conduits of the Air-Driven Generator 100 to displace the liquid working fluid.

As in FIG. 7, thus created is an air-driven generator for generating electric power from movement of a working fluid that has one or more elongate gravitational distribution conduits, each with an upper end and a lower end, and one or more elongate buoyancy conduits, each buoyancy conduit with an upper end and a lower end. The upper end or ends of the buoyancy conduits are in fluidic communication with the upper end or ends of the gravitational distribution conduits, and the lower end or ends of the gravitational distribution conduits are in fluidic communication with the lower end or ends of the buoyancy conduits whereby a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits. A fluid turbine system is fluidically interposed between the lower end or ends of the gravitational distribution conduit or conduits and the lower end or ends of the buoyancy conduits. An air injection system is operative to inject air into each of the buoyancy conduits with the air being compressed by the gaseous compression system 10 disclosed herein. Air supplied by the gaseous compression system 10 and injected into working fluid disposed in the buoyancy conduits will tend to induce upward flow of the working fluid in the buoyancy conduits, and working fluid fed to the upper end of the gravitational distribution conduit will have a downward flow within the gravitational distribution conduit to actuate the fluid turbine system. The combined teachings of the present disclosure and that of the references incorporated herein by reference thus discloses the Air-Driven Generator 100 receiving gas compressed using the present gaseous compression system 10.

Also pursuant to the thermodynamic method and system 10 disclosed herein, the amount of energy used in the operation of the heat pumps of the cascading intercoolers 16, 24, 31, 36, 44, and 48 can be collected by the heat pumps and used for secondary purposes to expand on the overall efficiency of even a larger fluid-flow system. By way of example and not limitation, heat collected by the heat pumps of the cascading intercoolers 16, 24, 31, 36, 44, and 48 can be harvested and exploited to heat the working fluids in the Air-Driven Generator of the present inventor's copending U.S. application Ser. No. 16/115,531 and PCT International Application No. PCT/US18/48413 thereby to improve the efficiency of the Air-Driven Generator 100 disclosed and protected therein.

Still further heat can be harvested and exploited, such as by overheating the fluid in the Air-Driven Generator 100 greater than the adiabatic heat alone and over-expanding the compressed air injected into the buoyancy conduits of the Air-Driven Generator 100. Such an over expansion of the gaseous fluid in the buoyancy conduits of the Air-Driven Generator 100 displaces a greater volume of the working fluid to create a larger motive force, which in turn generates more power.

Particularly in the initial compression cycles of the system 10, it is desired that the temperature of the cascading refrigeration heat pump intercoolers 16, 24, 30, and 36 be kept above freezing so condensed water vapor does not deposit on the cooling coils of the intercooler core 66. This helps to remove the water vapor in the air and reduces the energy needed for compression. When air is compressed, the air can no longer hold as much water vapor as before, and this forces the vapor condensate into liquid water to releases latent heat. The release of latent heat in the system 10 keeps the heat pump intercoolers 16, 24, 30, and 36 operating in a higher efficacy range. The removal of latent heat as well as frictional heat lowers the backpressure on the compressors 12, 22, 28, and 34 and lowers the energy required to compress the air.

In subsequent stages, the air is mechanically compressed to release more adiabatic heat and again raise the temperature of the air enough to put the air temperature back into the higher efficiency range of the heat pump refrigeration systems 44 and 48. This heated, compressed air is now again cooled with a refrigeration heat pump cycle back to a low temperature again to reduce the energy required to compress the air. This alternating mechanical cycle/low temperature refrigeration cycle is repeated many times until the desired final pressure is reached.

After several mechanical compression/refrigeration cycles, the water vapor content of the air is low enough to intercool the heated, compressed air to a lower sub-freezing temperature, which further reduces the energy needed for compression. The more the low temperature refrigeration cycle replaces the mechanical compression cycle, the lower the total consumption of power needed to compress the air to a final high pressure. As disclosed herein, because heat pumps have a very limited temperature range that they operate at very high coefficients of performance, the heat pump evaporator unit is configured in a cascading cooling intercooler configuration with multiple cascading intercoolers therewithin with the highest temperature cooling in the beginning of the intercooler then one or more lower temperature intercoolers.

This cascading intercooler configuration also serves to keep the coefficients of performance of the heat pumps very high by reducing the delta temperature difference of the condenser to the evaporator in each cycle. This is accomplished by having the lowest temperature refrigeration heat pump transfer its heat into the evaporator section of the next higher temperature refrigeration heat pump instead of exhausting it at the elevated room temperature or higher. It is recognized that, the higher the temperature of each refrigeration heat pump, the greater capacity it must have to handle the heat energy of not only that temperature range of intercooler but also the heat of the next lower refrigeration heat pump intercooler. In this way, the temperature of the evaporators can be raised to a very high-elevated temperature when all of the heat reaches the highest temperature heat pump. In addition to adiabatic heat, the refrigeration heat pumps also collect heat due to friction and the latent heat of water vapor condensation.

Particular examples and calculations can be provided to relay predicted performance of the gaseous fluid compression system 10 with it being understood that no representations as to actual performance are intended to be relied upon. In one illustrative but not limiting example, air is drawn into the gaseous compression system 10 at a gauge pressure of 0 psi and at an ambient temperature, which can be assumed to be 70° F. The high-pressure blower 12 intakes air through air intake 14 and compresses the air, such as to approximately 3.75 to 5.5 psi depending on the configuration of compression system 10 and other factors. That fluidic compression releases adiabatic heat and raises the temperature of the now compressed air to between 140° F. to 170° F. The cascading heat pump intercooler 16 removes the adiabatic heat thereby lowering the energy needed to compress the air further. The heat pump intercooler 16 reduces the temperature of the pressurized air, which results in a lower pressure. In embodiments of the system 10, for instance, the temperature may be lowered to approximately 33° F. lower than the original ambient temperature. As calculated, the net force required by the high-pressure blower 12 is reduced by 2 to 3 psi gauge pressure.

With further reference to FIG. 2, the air enters into the high temperature section of the first cascading intercooler 16. The air is cooled from 140° F. to 170° F. to about to 100° F. to 80° F. Then, the air enters into the medium temperature section of the intercooler 16. The air is cooled from 100° F. to 80° F. to about to 60° F. to 50° F. Then, the air enters into the low temperature section of the intercooler 16. There, the air is cooled from 60° F. to 50° F. to about to 33° F. A water trap 18 is operative to remove any condensed water, which can be used in the Air-Driven Generator 100.

In the second stage of the blower compression bank 20, air enters into second high-pressure blower 22 at a gauge pressure of 3.75 psi to 5.5 and 33° F., and the air is compressed 4 psi to 5.5 psi gauge pressure and again heats air to 140° F. to 170° F. At this point, the cumulative pressure increase is gauge pressure of 8 psi to 11 psi. Air then enters the high temperature section of the second cascading intercooler 22 where it is cooled from 140° F. to 170° F. to about to 100° F. to 80° F. The air then enters the medium temperature section of the intercooler 22 where it is cooled from 100° F. to 80° F. to about to 60° F. to 50° F. After that, the air enters the low temperature section of the intercooler 22 where it is cooled from 60° F. to 50° F. to about to 33° F. Water trap 26 operates to remove any condensed water, and that water can be collected for use in the Air-Driven Generator 100.

In the third stage of the blower compression bank 20, air enters into third high-pressure blower 28 at a gauge pressure of 8 psi to 11 psi and 33° F., and the air is compressed 4 psi to 5.5 psi gauge pressure and again heats air to 140° F. to 170° F. At this point, the cumulative pressure increase is gauge pressure of 16 psi to 18 psi. Air then enters the high temperature section of the third cascading intercooler 31 where it is cooled from 140° F. to 170° F. to about to 100° F. to 80° F. The air then enters the medium temperature section of the intercooler 31 where it is cooled from 100° F. to 80° F. to about to 60° F. to 50° F. After that, the air enters the low temperature section of the intercooler 31 where it is cooled from 60° F. to 50° F. to about to 33° F. A water trap 32 operates to remove any condensed water, and that water can be collected for use in the Air-Driven Generator 100.

In the fourth stage of the blower compression bank 20, air enters into fourth high-pressure blower 34 at a gauge pressure of 16 psi to 18 psi and 33° F., and the air is compressed 5 psi to 5.5 psi gauge pressure and again heats air to 140° F. to 170° F. At this point, the cumulative pressure increase is gauge pressure of 18 psi to 22 psi. Air then enters the high temperature section of the fourth cascading intercooler 36 where it is cooled from 140° F. to 170° F. to about to 100° F. to 80° F. The air then enters the medium temperature section of the intercooler 36 where it is cooled from 100° F. to 80° F. to about to 60° F. to 50° F. After that, the air enters the low temperature section of the intercooler 36 where it is cooled from 60° F. to 50° F. to about to 33° F. A water trap 38 operates to remove any condensed water, and that water can be collected for use in the Air-Driven Generator 100.

Air exiting the blower compression bank 20 enters the mechanical compression bank 30 where the high pressure blowers 12, 22, 28, and 34 are supplanted by mechanical compressor groups 42, 46 and 50 with reciprocating compressors. Air enters into the first group 42 of reciprocating compressors in the fifth stage of compression at a gauge pressure of 18 psi to 22 psi and 33° F. Air is compressed 20 psi to 30 psi gage pressure and again heats to 140° F. to 170° F. At this point, the cumulative pressure increase is to a gauge pressure of 40 psi to 65 psi. The air then enters the high temperature section 74 of the fifth cascading intercooler 44 where it is cooled from 140° F. to 170° F. to about to 100° F. to 80° F. Then, the air enters into the medium temperature section 76 of the cascading intercooler 44 where it is cooled from 100° F. to 80° F. to about to 60° F. to 50° F. The air then enters the low temperature section 78 of the intercooler 44 where it is cooled from 60° F. to 50° F. to approximately 33° F. A water trap can remove condensed water and collect the same, such as for use in the Air-Driven Generator 100.

Air enters the second group 46 of reciprocating compressors in the sixth stage of compression at a gauge pressure of 40 psi to 65 psi and 33° F. Air is compressed 20 psi to 30 psi gage pressure and again heats to 140° F. to 170° F. The cumulative pressure increase is to a gauge pressure of 65 psi to 85 psi. The air subsequently enters the high temperature section of the fifth cascading intercooler 48 where it is cooled from 140° F. to 170° F. to about to 100° F. to 80° F. Then, the air enters into the medium temperature section of the cascading intercooler 48 where it is cooled from 100° F. to 80° F. to about to 60° F. to 50° F. The air then enters the low temperature section of the intercooler 48 where it is cooled from 60° F. to 50° F. to approximately 33° F. A water trap can remove condensed water and collect the same, such as for use in the Air-Driven Generator 100.

In the seventh stage of compression, air enters the third group 50 of reciprocating compressors, which can comprise a single compressor, at a gauge pressure of 65 psi to 85 psi and 33° F. Air is compressed 50 psi to 150 psi gage pressure and again heats to 140° F. to 170° F. The cumulative pressure increase is to a gauge pressure of 125 psi to 250 psi. Should higher pressures be required, then additional stages can be added to reach the desired psi. After the last stage of compression, the air is not after cooled so the additional heat and resulting psi can be employed to inject the air into the Air-Driven Generator 100 to displace the working fluid.

The gaseous compression system 10 and method disclosed therein, which has been described with reference to air but which can be used in relation to other gases, is calculated to be capable of reducing power consumption by over 50%. The compression system 10 uses alternating compressors and refrigeration heat pumps to remove the adiabatic heat and lower the backpressure and in turn the energy required to compress the air. This lowers the energy of the mechanical compressors by about 60%.

With certain details and embodiments of the present invention for a gaseous fluid compression system 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. In one non-limiting example, smaller, lower volume systems could use only reciprocating compressors or, in theory, only high-pressure blower compressors. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all legally cognizable equivalents thereof.

What is claimed as deserving the protection of Letters Patent:

1. A gaseous compression system for compressing a gas from an initial pressure to an exit pressure, the gaseous compression system comprising:
   a first compression bank wherein the first compression bank comprises a stage of gaseous compression with a first gaseous fluid compressor and a first cascading heat pump intercooler fluidically coupled to the first gaseous fluid compressor wherein the first compression bank is operative to bring the gas from an intake pressure to a first elevated gauge pressure; and
   a second compression bank fluidically coupled to receive the gas from the first compression bank wherein the second compression bank comprises a stage of gaseous compression with a second gaseous fluid compressor and a second cascading heat pump intercooler fluidically coupled to the second gaseous fluid compressor wherein the second compression bank is operative to bring the gas to the exit pressure
   wherein each of the first and second cascading heat pump intercoolers comprise at least a higher temperature section and a lower temperature section, each of the higher temperature section and the lower temperature section including an independently operable intercooler core configured to remove heat from the gas such that the intercooler core of the lower temperature section is configured to receive the gas after being cooled by the higher temperature section, and
   wherein the higher temperature section is configured to remove heat from the gas at a higher temperature than the lower temperature section, wherein the lower temperature section includes a condenser thermally coupled with the intercooler core of the higher temperature section such that the lower temperature section uses a temperature of the intercooler core of the higher temperature section as a basis for the condensing temperature of the lower temperature section.

2. The gaseous compression system of claim 1, wherein the exit pressure is greater than the first elevated gauge pressure.

3. The gaseous compression system of claim 1, wherein the cascading heat pump intercooler further comprises a third temperature section fluidically disposed after the lower temperature section and including an independently operable intercooler core configured to remove heat from the gas after being cooled by the lower temperature section, wherein the third temperature section is configured to remove heat from the gas at temperature below that of the lower temperature section.

4. The gaseous compression system of claim 1, wherein the first compression bank comprises a blower compression bank wherein the first gaseous fluid compressor of the stage of gaseous compression of the first compression bank comprises a high-pressure blower and wherein the second compression bank comprises a mechanical compression bank wherein the second gaseous fluid compressor of the stage of gaseous compression of the mechanical compression bank comprises a mechanical compressor.

5. The gaseous compression system of claim 4, wherein the second gaseous fluid compressor of the stage of gaseous compression of the mechanical compression bank comprises a mechanical compressor comprising a rotary compressor or a reciprocating compressor.

6. The gaseous compression system of claim 5, wherein the second gaseous fluid compressor of the stage of gaseous compression of the mechanical compression bank comprises a reciprocating compressor.

7. The gaseous compression system of claim 4, wherein the blower compression bank comprises plural stages of gaseous compression wherein each stage has a high-pressure blower gaseous fluid compressor and a heat pump intercooler fluidically coupled to the high-pressure blower gaseous fluid compressor and wherein the mechanical compression bank comprises plural stages of gaseous compression wherein each of the plural stages has a mechanical gaseous fluid compressor and a heat pump intercooler fluidically coupled to the mechanical gaseous fluid compressor.

8. The gaseous compression system of claim 7, wherein the blower compression bank comprises at least four stages of gaseous compression, each stage with a high-pressure blower gaseous fluid compressor and a heat pump intercooler fluidically coupled to the high-pressure blower gaseous fluid compressor.

9. The gaseous compression system of claim 8, wherein the mechanical compression bank comprises at least three stages of gaseous compression, each stage with a mechanical gaseous fluid compressor and a heat pump intercooler fluidically coupled to the mechanical gaseous fluid compressor.

10. The gaseous compression system of claim 7, further comprising an outlet of the gaseous compression system and wherein the mechanical compression bank further comprises a final stage of gaseous compression wherein the final stage has a mechanical gaseous fluid compressor without a heat pump intercooler fluidically interposed between the mechanical gaseous fluid compressor and the outlet.

11. The gaseous compression system of claim 1, further comprising an outlet of the gaseous compression system and further comprising a gas-driven generator for generating electric power from movement of a working fluid wherein the gas-driven generator is fluidically coupled to the outlet.

12. The gaseous compression system of claim 7, further comprising a water trap fluidically coupled to each cascading heat pump intercooler, the water trap operative to remove condensed water.

13. A gaseous compression system for compressing a gas from an initial pressure to an exit pressure, the gaseous compression system comprising:
- a first compression bank with plural stages of gaseous compression wherein each stage has a gaseous fluid compressor and a cascading heat pump intercooler fluidically coupled to the gaseous fluid compressor,
- wherein each cascading heat pump intercoolers comprise at least a higher temperature section and a lower temperature section, each of the higher temperature section and the lower temperature section including an independently operable intercooler core configured to remove heat from the gas such that the intercooler core of the lower temperature section is configured to receive the gas after being cooled by the higher temperature section, and
- wherein the higher temperature section is configured to remove heat from the gas at a higher temperature than the lower temperature section, wherein the lower temperature section includes a condenser thermally coupled with the intercooler core of the higher temperature section such that the lower temperature section uses a temperature of the intercooler core of the higher temperature section as a basis for the condensing temperature of the lower temperature section.

14. The gaseous compression system of claim 13, further comprising a second compression bank fluidically coupled to receive the gas from the first compression bank wherein the second compression bank comprises plural stages of gaseous compression with a gaseous fluid compressor and a heat pump intercooler fluidically coupled to the gaseous fluid compressor wherein the second compression bank is operative to bring the gas to the exit pressure.

15. The gaseous compression system of claim 13, wherein the cascading heat pump intercooler further comprises a third temperature section fluidically disposed after the lower temperature section and including an independently operable intercooler core configured to remove heat from the gas after being cooled by the lower temperature section, wherein the third temperature section is configured to remove heat from the gas at temperature below that of the lower temperature section.

16. The gaseous compression system of claim 14, wherein the first compression bank comprises a blower compression bank wherein the gaseous fluid compressor of each stage of gaseous compression of the first compression bank comprises a high-pressure blower and wherein the second compression bank comprises a mechanical compression bank wherein the gaseous fluid compressor of each stage of gaseous compression of the mechanical compression bank comprises a mechanical compressor.

17. The gaseous compression system of claim 16, wherein the mechanical compressor comprises a rotary compressor or a reciprocating compressor.

18. The gaseous compression system of claim 17, wherein the gaseous fluid compressor comprises a reciprocating compressor.

19. The gaseous compression system of claim 16, wherein the blower compression bank comprises at least four stages of gaseous compression, each stage with a high-pressure blower gaseous fluid compressor and a heat pump intercooler fluidically coupled to the high-pressure blower gaseous fluid compressor.

20. The gaseous compression system of claim 19, wherein the mechanical compression bank comprises at least three stages of gaseous compression, each stage with a mechanical gaseous fluid compressor and a heat pump intercooler fluidically coupled to the mechanical gaseous fluid compressor.

21. The gaseous compression system of claim 13, further comprising an outlet of the gaseous compression system and further comprising a final stage of gaseous compression wherein the final stage has a mechanical gaseous fluid compressor without a heat pump intercooler fluidically interposed between the mechanical gaseous fluid compressor and the outlet.

22. The gaseous compression system of claim 13, further comprising an outlet of the gaseous compression system and further comprising a gas-driven generator for generating electric power from movement of a working fluid wherein the gas-driven generator is fluidically coupled to the outlet.

* * * * *

UNITED STATES PATENT AND TRADEMARK OFFICE
CERTIFICATE OF CORRECTION

PATENT NO. : 10,989,110 B2
APPLICATION NO. : 16/250736
DATED : April 27, 2021
INVENTOR(S) : Mark J. Maynard It is certified that error appears in the above-identified patent and that said Letters Patent is hereby corrected as shown below:

In the Claims

At Column 15, Claim number 1, Line number 49, please add a --,-- after "pressure"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*